United States Patent
Forte et al.

(10) Patent No.: US 9,444,116 B2
(45) Date of Patent: Sep. 13, 2016

(54) ELECTROCHEMICAL CONVERTER

(75) Inventors: Pierre Forte, Bayonne (FR); Catherine Lepiller, Ahetze (FR)

(73) Assignee: PRAGMA INDUSTRIES, Bidart (FR)

( * ) Notice: Subject to any disclaimer, the term of this patent is extended or adjusted under 35 U.S.C. 154(b) by 799 days.

(21) Appl. No.: 13/993,143

(22) PCT Filed: Apr. 8, 2011

(86) PCT No.: PCT/FR2011/050798
§ 371 (c)(1),
(2), (4) Date: Jul. 19, 2013

(87) PCT Pub. No.: WO2011/124863
PCT Pub. Date: Oct. 13, 2011

(65) Prior Publication Data
US 2014/0134512 A1    May 15, 2014

(30) Foreign Application Priority Data
Apr. 8, 2010  (FR) .................................. 10 52660

(51) Int. Cl.
*H01M 8/24* (2016.01)
*H01M 8/02* (2016.01)
*H01M 8/10* (2016.01)
*H01M 8/04* (2016.01)

(52) U.S. Cl.
CPC ......... *H01M 8/2405* (2013.01); *H01M 8/0254* (2013.01); *H01M 8/0267* (2013.01); *H01M 8/0273* (2013.01); *H01M 8/04014* (2013.01); *H01M 8/1004* (2013.01); *H01M 8/1097* (2013.01); *H01M 8/241* (2013.01); *H01M 8/2465* (2013.01); *H01M 8/249* (2013.01); *Y02E 60/521* (2013.01)

(58) Field of Classification Search
CPC ........... H01M 8/2405; H01M 8/0254; H01M 8/0273; H01M 8/1004; H01M 8/1097; H01M 8/241; H01M 8/249; H01M 8/04014; H01M 8/0465; H01M 8/2465
See application file for complete search history.

(56) References Cited

U.S. PATENT DOCUMENTS

| | | |
|---|---|---|
| 5,863,672 A | 1/1999 | Ledjeff et al. |
| 2002/0076597 A1 | 6/2002 | Chang et al. |
| 2004/0112532 A1 | 6/2004 | Yandrasits et al. |

FOREIGN PATENT DOCUMENTS

| | | |
|---|---|---|
| EP | 1846976 | 10/2007 |
| JP | 2003264003 | 9/2003 |
| WO | 2006075119 | 7/2006 |

OTHER PUBLICATIONS

International Search Report Intl. App. PCT/FR2011/050798 dated Aug. 26, 2011.

*Primary Examiner* — Helen O Conley
(74) *Attorney, Agent, or Firm* — Perman & Green, LLP

(57) ABSTRACT

An electrochemical converter with proton membrane includes a plurality of electrochemical unitary cells connected in series and arranged on a carrier tape elongated along a longitudinal axis, a first face of which has anodes that receive hydrogen and a second face has cathodes that receive air, wherein the hydrogen circulates in a flow parallel to the longitudinal axis of the aforementioned tape and the air circulates in a flow transverse to the longitudinal axis of the aforementioned tape, and separation means dividing the air flow into a cooling flow having no contact with the cathodes and a cathodic reaction flow in contact with the cathodes.

8 Claims, 4 Drawing Sheets

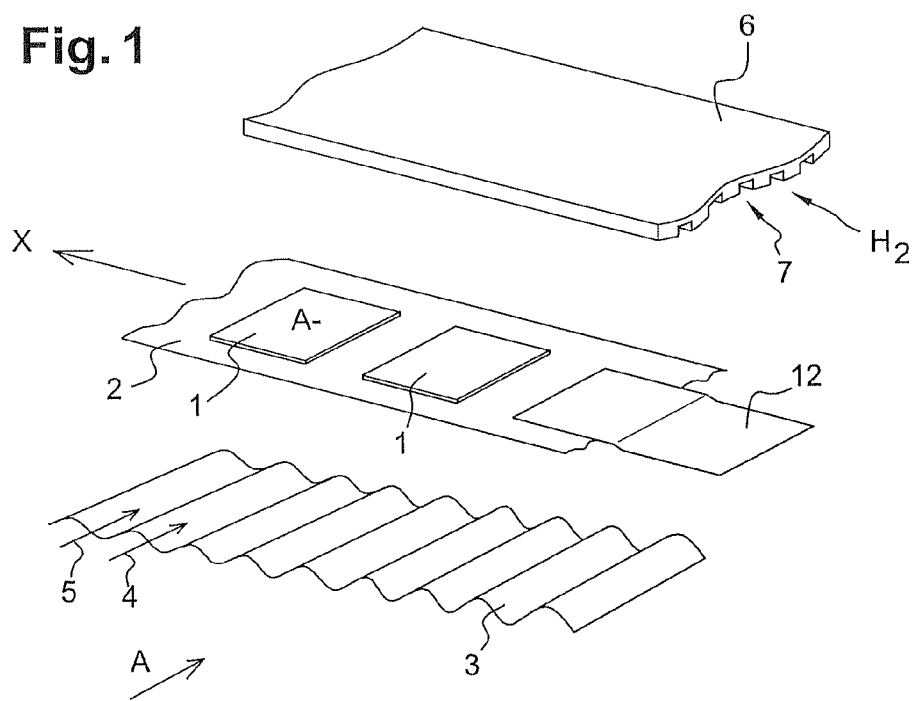
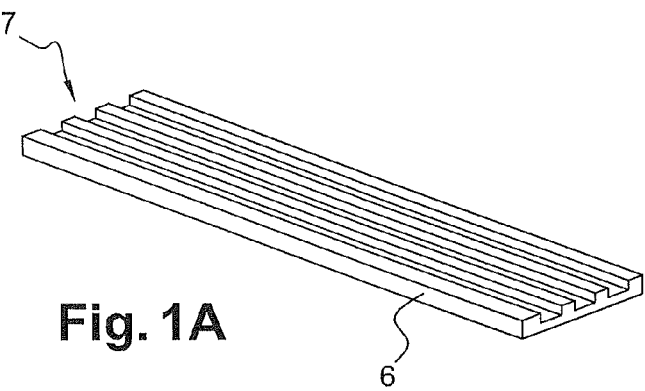

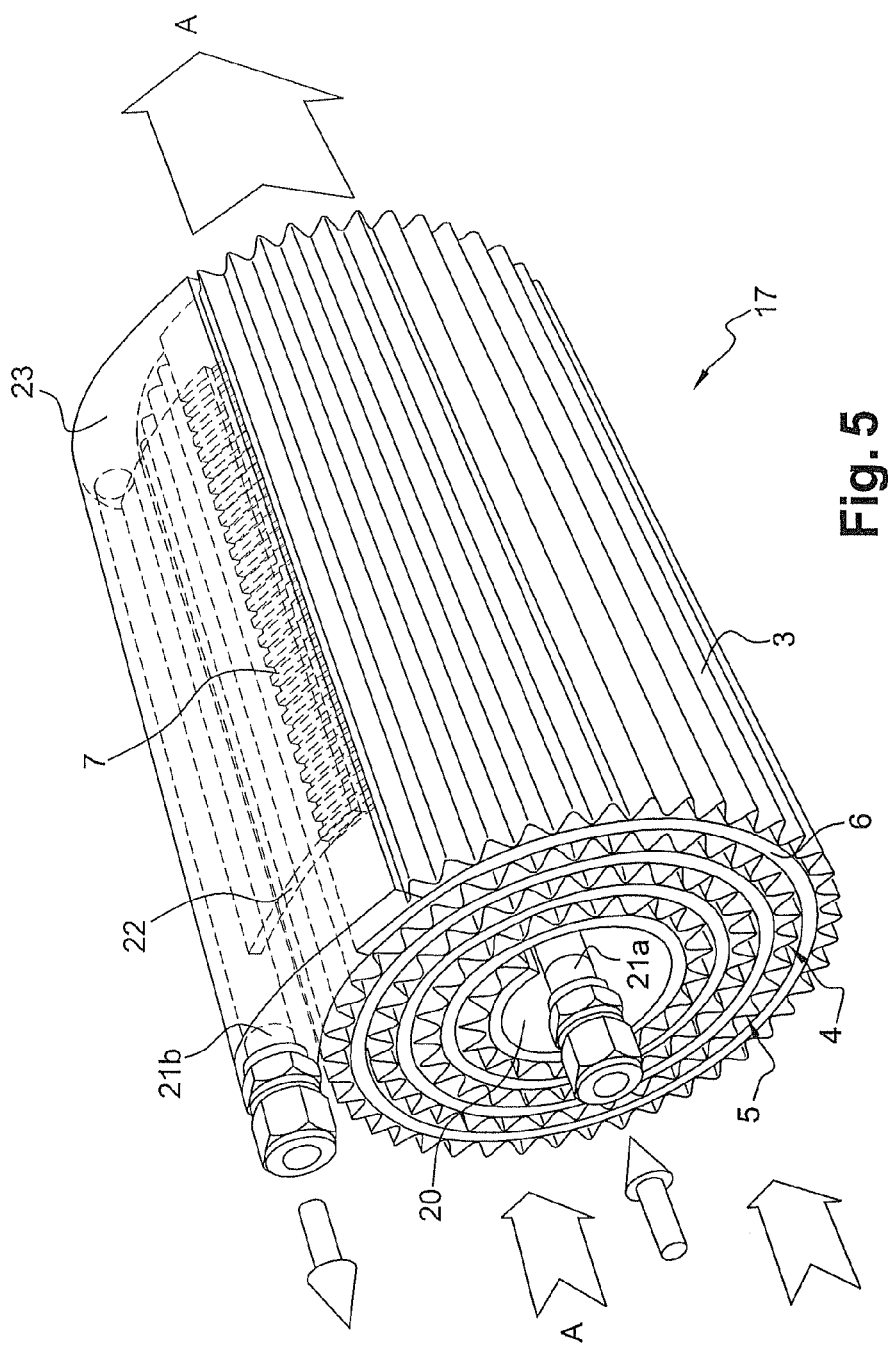

US 9,444,116 B2

ELECTROCHEMICAL CONVERTER

CROSS-REFERENCE TO RELATED APPLICATIONS

This application is the National Stage of International Application No. PCT/FR2011/050798 International Filing date, 8 Apr. 2011, which designated the United States of America, and which International Application was published under PCT Article 21 (s) as WO Publication 2011/124863 A1 and which claims priority from, and benefit of, French Application No. 1052660 filed on 8 Apr. 2010, the disclosures of which are incorporated herein by reference in their entireties.

BACKGROUND

The disclosed embodiment concerns an improved fuel cell type of electrochemical converter.

Document EP1 846 976 A1 describes an electrochemical converter with proton membrane comprising a plurality of electrochemical cells connected in series, which comprises a first substrate, in the form of a continuous tape elongated along a longitudinal axis and second substrates in the form of segments of tape, the first substrate comprising a first face on which a succession of first deposits is realized so as to form a series of spaced anodes, and a second face on which a succession of second deposits is realized so as to form a series of spaced cathodes arranged opposite said anodes, said anodes and cathodes forming a succession of electrochemical unitary cells, the first substrate being provided with a succession of feed-throughs for the second substrates, the second substrates being sized to produce a connection track between a cathode of one unitary cell and an anode of an adjacent unitary cell.

In this converter, eliminating dipolar plates makes possible a significant saving of mass, a simplification and increase in the energy density of the fuel cell and allows the fuel cell to be wound about itself.

However, this increase in density has a drawback, namely that it is more difficult to cool the fuel cell.

SUMMARY

The disclosed embodiment aims to overcome this problem and, to do this, proposes an electrochemical converter with proton membrane comprising a plurality of electrochemical cells connected in series and arranged on a carrier tape elongated along a longitudinal axis, which will be referred to subsequently as carrier tape, a first face of which has anodes that receive hydrogen and a second face has cathodes that receive air, wherein the hydrogen circulates in a flow parallel to the longitudinal axis of said tape and the air circulates in a flow transverse to the longitudinal axis of said tape, separation means dividing the air flow into a cooling flow having no contact with the cathodes and a cathodic reaction flow in contact with the cathodes.

Preferably, the separation means are made of a corrugated film, the corrugations of which are arranged perpendicular to the longitudinal axis of the tape.

Advantageously, on the anodes side, the carrier tape is covered by an elastomer covering provided with longitudinal channels for the passage of hydrogen.

The tape is advantageously made from two bands wherein a succession of unitary cell retention windows are formed and which are provided with feed-through slots for strips forming gas diffusion layers and electrical connections between successive anodes and cathodes.

The bands are advantageously made from a thermoplastic polymer impermeable to gases and assembled one on top of the other so as to enclose the unitary cells.

The strips are preferably made from a polymer material, woven or not, provided with a hydrophobic treatment.

The strips are advantageously metallized so as to carry the current between the anodes and the cathodes.

According to an aspect of the disclosed embodiment, the strips pass from one side of the tape to the other at the feed-through slots, an adhesive or a thermoplastic adhesive film closing the slots so as to be impermeable to gases.

The disclosed embodiment may also include an electrochemical converter, characterized in that it comprises a tape carrying electrochemical unitary cells, strips linking the successive anodes and cathodes of said cells thus connected in series, an elastomer covering provided with passages in a longitudinal direction of the tape on a side of the tape provided with anodes, a corrugated film whose corrugations are aligned transversally to the tape, said tape, said covering and said film being wound in a spiral so as to form a compact cylindrical electrochemical converter which is supplied with air in a direction parallel to the axis of the cylinder, the corrugated film forming a barrier separating air for cooling from air supplying the cathodes.

The disclosed embodiment may also include a method for manufacturing a cylindrical electrochemical converter comprising a converter element realized from a tape carrying a plurality of electrochemical unitary cells, strips for connecting successive anodes and cathodes, comprising in addition means of separating an air flow into two parts on the cathodes side of the unitary cells in the form of a corrugated film and comprising a means of supplying hydrogen to the anodes of the cells in the form of a covering fitted with longitudinal channels characterized in that the cells are assembled on the tape, the strips are inserted into the tape and applied onto the faces of the cells, the covering is applied onto the tape on the anodes side, the corrugated film is placed on the side of the elastomer covering opposite the longitudinal channels and then the tape covered by the covering and corrugated film is wound about itself such that one face of the corrugated film comes into contact with the face of the tape carrying the cathodes.

BRIEF DESCRIPTION OF THE DRAWINGS

Other features and advantages of the disclosed embodiment will become apparent in reading the following description of a non-limiting example of realization of the disclosed embodiment with drawings, which show:

in FIG. 1: a perspective view of a detail of an example of realization of a converter according to the disclosed embodiment;

in FIG. 1A: a perspective view from below of a covering according to the disclosed embodiment;

in FIG. 5: a perspective view of a cylindrical converter according to the disclosed embodiment.

DETAILED DESCRIPTION

FIG. 1 represents a proton-membrane electrochemical converter element realized according to the disclosed embodiment, which comprises a plurality of electrochemical unitary cells 1 connected in series and arranged on a carrier tape 2 elongated along a longitudinal axis.

Figure 1B:
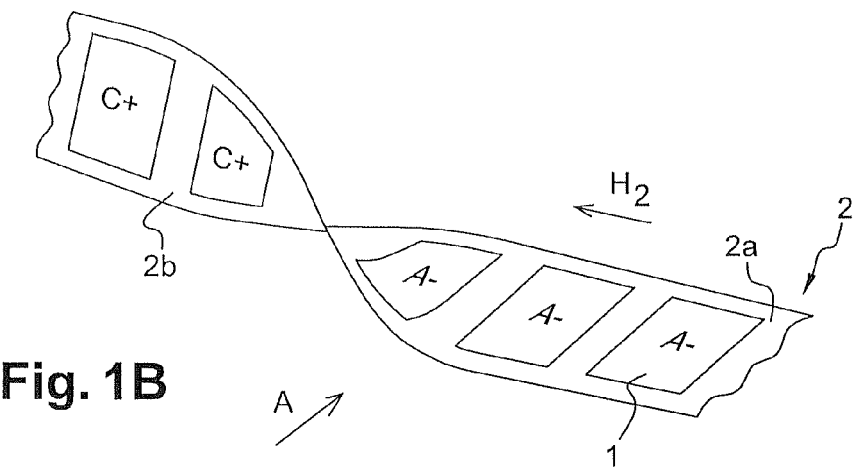
in FIG. 1B: a perspective view of the tape in FIG. 1 twisted.

As represented in FIG. 1B, where the tape 2 has been twisted so as to show its top and bottom, a first face 2a of the carrier tape has anodes A- and receives hydrogen H2 and a second face 2b of the tape has cathodes C+ and receives air A.

The hydrogen circulates in a flow parallel to the longitudinal axis X of the carrier tape 2 and the air circulates in a flow transverse to the longitudinal axis of this tape.

According to the disclosed embodiment, separation means, identified as 3 in FIG. 1, divide the air flow into two parts, namely a cooling flow 4 having no contact with the cathodes and a cathodic reaction flow 5 in contact with the cathodes C+.

This has the advantage of increasing the overall air flow without increasing the stoichiometric ratio.

These separation means 3 are made, according to the example, of a corrugated film, the corrugations of which are arranged perpendicular to the longitudinal axis X of the carrier tape.

It should be noted that the cathodic reaction flow plays a role in the cooling.

Thus, the partial flows 4 and 5 play a role in the cooling, whereas only the flow 5 plays a role in the cathodic reaction.

This allows improved cooling of the fuel cell without increasing the cathodic air flow too much, which might pose water imbalance problems at the electrolyte and may lead to drying-out through over-ventilation.

The separation means of the invention allows the ratio (reaction air flow rate)/(cooling air flow rate) to be varied by varying the geometry of the corrugated film, e.g. by realizing asymmetric corrugations making one passing section larger on one side than the other.

The advantage of using a corrugated film is its simplicity of utilization, because the corrugations naturally form means of separating layers when layers of cells are stacked or when the tape carrying the cells is wound up, as in this realization.

The corrugated film may, in particular, be made from a PET plastic with a thickness of the order of ¼ mm or between ⅕ and ⅓ mm.

The corrugations or flutes are heat-formed by passing the film through a forming tool.

The corrugations are designed to withstand crushing when layers of cells are stacked or tapes are wound to produce a complete converter.

On the anodes side, the carrier tape carrying the succession of electrochemical unitary cells is covered by an elastomer covering 6 provided with longitudinal channels 7 for the passage of hydrogen.

The elastomer covering has a thickness of the order of 1 mm, e.g. between 0.8 and 1.2 mm.

The longitudinal channels are in the form of grooves of 0.5 to 2 mm wide and 0.5 to 1 mm deep.

This elastomer covering, of a width equivalent to the width of the tape carrying the unitary cells, is made from a material such as a silicone, EPDM, polyisobutylene, polyethylene acrylic or chlorosulfonated polyethylene, and is fixed hermetically on the edges of the tape by gluing or hot lamination to form a channeling means wherein the hydrogen circulates.

Figure 4:
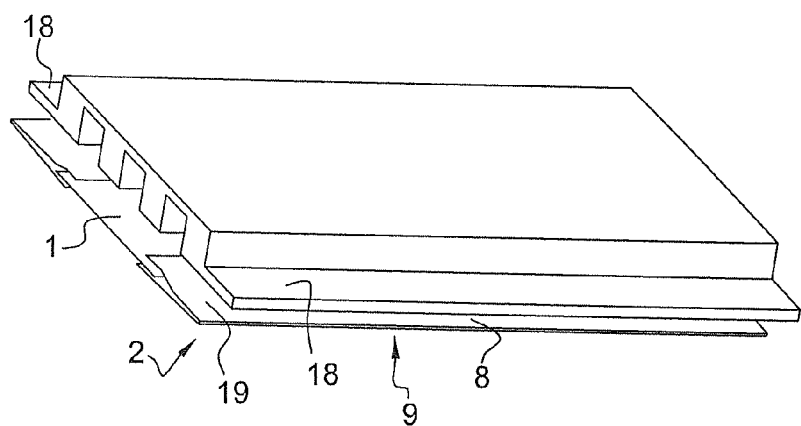
in FIG. 4: a perspective view of a step of fitting the tape of FIG. 3 with a covering of the disclosed embodiment.

FIG. 4 gives an example of realization where the covering is provided with lateral wings 18 intended to be glued onto the edges 19 of the tape comprising the cells 1 and formed by the gluing of bands 8 and 9.

Figure 2:
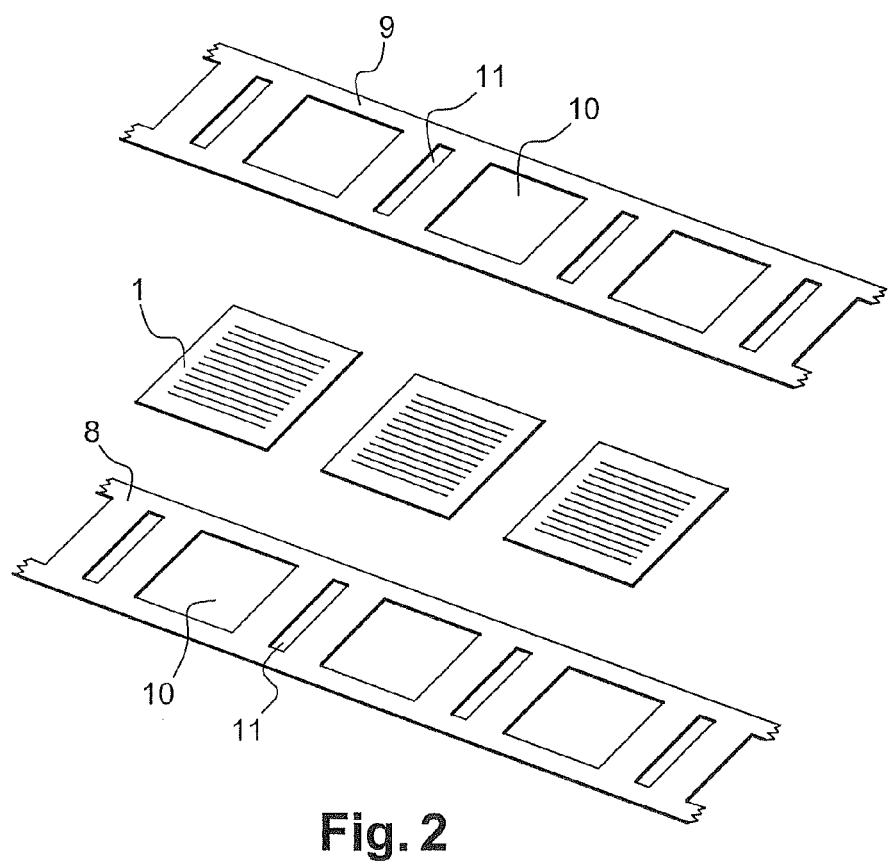
in FIG. 2: an exploded view of a support tape for cells of the disclosed embodiment according to a first assembly step.

The tape forming a first substrate is, according to the example of FIG. 2, made from two bands 8, 9 punched or cut out to form a succession of windows 10 retaining unitary cells 1 and provided with slots 11 for the passage of strips 12 forming gas diffusion layers and electrical connections between successive anodes and cathodes.

The thickness of the finished tape is in a range of 50 to 150 micrometers, the bands being made from an insulating thermoplastic material and in particular a thermoplastic polymer impermeable to gases, the bands being assembled one on top of the other so as to enclose the unitary cells 1 as known, for example, from document US2004/0112532 A1.

In order to connect the unitary cells in series it is necessary to traverse the tape, the anodes and cathodes being on opposite sides thereof.

Figure 3:
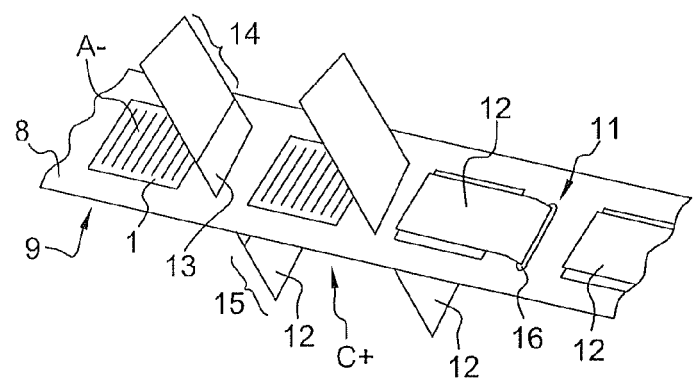
in FIG. 3: a perspective view of the support tape of FIG. 2 according to a second assembly step.

FIG. 3 illustrates the placing of the strips 12, which are inserted into the slots 11 and then applied on the electrodes on and under the tape.

The strips 12 pass from one side of the tape to the other at the feed-through slots 11.

To complete the assembly of the strips, an adhesive or a thermoplastic adhesive film 16 closes the slots so as to be impermeable to gases.

For this, for example, a temperature and/or ultraviolet polymerizing resin or a thermoplastic adhesive film is used.

The assembly must remain flexible after gluing to allow the tape to be wound in a spiral.

The solvent-free type of resins used can be silicones, acrylates, urethanes or modified epoxy resins.

Silicone or epoxy resins will be preferred because of their greater resistance to the acidity and humidity conditions of this application.

In order to impregnate the textile of the strips in a perfectly hermetic way, allow speedy gluing and obtain good adherence, the viscosity of the resins can be between 0.3 and 50 Pa·s. The optimum viscosity depends on the thickness and density of the textile's fibers.

In the case where a thermoplastic film is used, this can be chosen from among the family of modified polyolefins, polyesters, polyamides or polyether amides.

It can be applied under pressure or hot-applied.

The strips 12 making these feed-throughs have a dual function, letting the gases pass to the electrodes and conducting the current from one electrode to another.

These strips are made from a polymer material, woven or not, provided with a hydrophobic treatment.

The polymer can be based on polyamide, polyester, aramid, or a woven combination of these materials.

The intrinsic characteristics of this material are chosen according to its dual role as connection track and gas diffusion layer in a fuel cell, i.e. a fiber density that ensures a good compromise between high gas permeability and high electrical conductivity after a step of metallizing the material.

For electrical conductivity, the strips 12 are metallized so as to provide the connection between their areas 14, 15 of contact with the anodes and cathodes.

The strips are also covered with a hydrophobic material, e.g. comprising a thermoplastic polymer elastomer intended to give the substrate partially hydrophobic properties that will allow the water generated by the fuel cell in operation to be evacuated.

The hydrophobic covering can comprise a carbon-based porous conductive material.

Alternatively it can be supplemented by a surface deposit comprising a carbon-based porous conductive material.

FIG. 5 is a schematic of an electrochemical converter in a spiral, which comprises a tape carrying electrochemical unitary cells, wherein strips link the successive anodes and cathodes so that the cells are connected in series, an elastomer covering 6 provided with passages 7 in a longitudinal direction of the tape on a side of the tape provided with anodes, a corrugated film 3 on the side of the tape carrying the cathodes, whose corrugations are aligned transversally to the tape 2, said tape, said covering 6 and said film 3 being wound in a spiral so as to form a compact cylindrical electrochemical converter 17.

The air supply A of the converter is done in a direction parallel to the axis of the cylinder, the corrugated film forming a barrier separating the cooling air 4 and the air supplying the cathodes 5.

The hydrogen circuit H2 is realized from input 21a and output 21b tubes, these tubes being connected to the passages 7 by ducts 22 linking a slot made in the tube and the extremity of the covering 6.

The hydrogen output tube, the flat output duct and the end of the covering are covered by a cover 23, for example realized with a resin or a product such as a sealant mastic.

On the side of the hydrogen input in the axis of the cylinder formed by the wound-up fuel cell, the connection of the tube 21a can be performed by a flexible duct, the central space of the fuel cell possibly being filled with a filler material.

To manufacture such a converter, the cells are assembled on the tape, for example as seen above, by trapping the cells between two bands provided with windows, the strips are inserted into the tape at the slots made in the latter and they are applied onto the faces of the cells, the covering 6 is applied onto the tape on the anodes side, the corrugated film is placed on the side of the elastomer covering opposite the longitudinal channels and then the tape covered by the covering and corrugated film is wound about itself or on a mandrel such that one face of the corrugated film comes into contact with the face of the tape carrying the cathodes.

Winding the fuel cell about itself provides a certain compactness and offers a more favorable form factor for integration into a system.

In addition, winding the fuel cell about itself encourages thermal uniformity between the different cells, the heat generated by the electrochemical reaction on the cathode side spreading from one cell to another by contact between the various strata of the coil formed.

To finish the converter, the end cells of the tape are electrically connected to output contacts, a hydrogen supply end-fitting is placed on the termination of the longitudinal channels 7 outside the winding, a hydrogen recovery end-fitting is placed at the central axis or mandrel 20 of the converter, which is placed in a tube whose extremities serve as air inlet and outlet respectively.

The invention claimed is:

1. An electrochemical converter with proton membrane comprising a plurality of electrochemical unitary cells connected in series and arranged on a carrier tape elongated along a longitudinal axis, a first face of which has anodes that receive hydrogen and a second face has cathodes that receive air, wherein the hydrogen circulates in a flow parallel to the longitudinal axis of said tape and the air circulates in a flow transverse to the longitudinal axis of said tape, separation means dividing the air flow into cooling flow having no contact with the cathodes and a cathodic reaction flow in contact with the cathodes the tape carrying the cathodes and a second face opposite to the first face and providing said cathodic reaction flow on the first face in contact with the face carrying the cathodes of said tape and providing said cooling flow on the second face not in contact with said face carrying the cathodes, wherein the separation means are made of a corrugated film, the corrugations of which are arranged perpendicular to the longitudinal axis of the carrier tape and wherein the ratio of reaction air flow rate versus cooling air flow rate is configured with the geometry of the corrugated film by comprising asymmetric corrugations making one passing section larger on one side than the other.

2. The electrochemical converter according to claim 1 wherein, on the anodes side, the carrier tape is covered by an elastomer covering provided with longitudinal channels for the passage of hydrogen.

3. The electrochemical converter according to claim 1 wherein the carrier tape is made from two bands, wherein a succession of retention windows for unitary cells is formed and which are provided with feed-through slots for strips forming gas diffusion layers and electrical connections between successive anodes and cathodes.

4. The electrochemical converter according to claim 3 wherein the hands are made from a thermoplastic polymer impermeable to gases and assembled one on top of the other so as to enclose the unitary cells.

5. The electrochemical converter according to claim 3 wherein the strips are made from a polymer material, woven or not, provided with a hydrophobic treatment.

6. The electrochemical converter according to claim 5 wherein the strips are metallized.

7. The electrochemical converter according to claim 3 wherein the strips pass from one side of the tape to the other at the feed-through slots, an adhesive or a thermoplastic adhesive film closing the slots so as to be impermeable to gases.

8. The electrochemical converter according to claim 1, comprising the tape carrying electrochemical unitary cells, strips linking the successive anodes and cathodes of the cells thus connected in series, an elastomer covering provided with passages in a longitudinal direction of the tape on a side of the tape provided with anodes, a corrugated film forming the separation means whose corrugations are aligned transversally to the tape, the tape, the covering, and the film being wound in a spiral so as to form a compact cylindrical electrochemical converter which is supplied with air in a direction parallel to the axis of the cylinder, the corrugated film forming a barrier separating air for cooling from air supplying the cathodes.

* * * * *